UNITED STATES PATENT OFFICE.

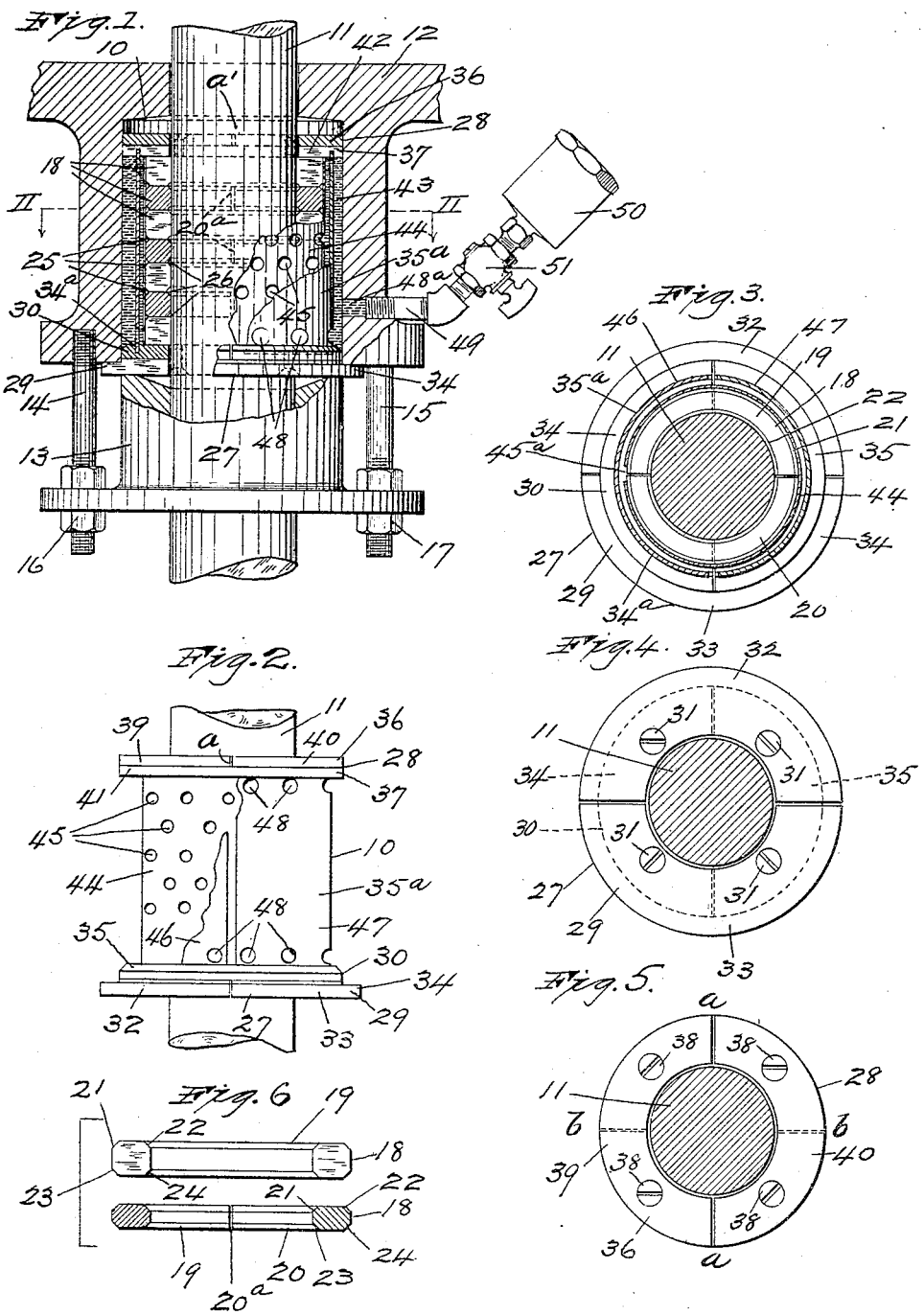

GEORGE W. LAUGHTON, OF NEW YORK, N. Y., ASSIGNOR OF ONE-HALF TO DANIEL C. WHANNELL, OF BROOKLYN, NEW YORK.

ROD-PACKING.

1,050,219.

Specification of Letters Patent.

Patented Jan. 14, 1913.

Application filed January 19, 1912. Serial No. 672,220.

*To all whom it may concern:*

Be it known that I, GEORGE W. LAUGHTON, a citizen of the United States, and a resident of New York, borough of Brooklyn, county of Kings, and State of New York, have invented a certain new and useful Improvement in Rod-Packings, of which the following is a full, clear, and exact specification.

This invention relates more particularly to a class of packings adapted for use upon the piston rods of machines, and pumps of various kinds.

My invention has for its object primarily to provide a form of packing designed to be employed especially upon the piston rods of engines, pumps, air compressors, or the like for preventing the escape of steam, air, or other motive fluid during the reciprocation of the rod, and which is mainly composed of a plurality of annular members or rings each consisting of a number of segments or sections so formed that when assembled the packing will conform to any alinement of the piston rod resulting from wear or otherwise.

Another object of the invention is to provide means adapted to supply under pressure a lubricant at suitable intervals to the parts of the packing; and a further object of the invention is to provide a rod packing which may be made of any preferred metal, fiber, or other suitable material adapted to be used in conjunction with the ordinary stuffing box, and which may be applied upon a piston rod without disconnecting it from the cross head.

With these and other objects in view, the invention will be hereinafter more particularly described with reference to the accompanying drawings, which form a part of this specification, and will then be pointed out in the claims at the end of the description.

In the drawings, Figure 1 is a fragmentary side view, partly in section and partly in detail, of one form of my packing applied to a piston rod and showing the use of a compression cup for feeding a lubricant to the packing. Fig. 2 is a side view, partly broken away, of the packing and piston rod. Fig. 3 is a section taken on the line II—II of Fig. 1. Fig. 4 is an inverted plan, of the packing and piston rod in section. Fig. 5 is a top plan of the packing and piston rod in section, and Fig. 6 represents two side views, partly in section, of one of the segments of two of the annular members or rings.

In practice the packing or device 10 is applied upon the piston rod 11 adapted to reciprocate through a stuffing box 12 and a gland 13 provided upon the cylinder or casing of an engine, pump, or other form of machine. The stuffing box and gland may be of the usual or any preferred form, and are connected by threaded bolts 14 and 15 which may be suitably adjusted by nuts 16 and 17 for holding the packing 10 around the piston rod 11 and within said stuffing box, as shown in Fig. 1.

The packing 10 has a plurality of annular members or rings 18 which are superposed one upon the other and arranged so as to encircle the piston rod 11. Each of the rings 18 is composed of two segments or sections 19 and 20 so as to permit the rings to be laterally expansible in order to conform with any inequalities of the piston rod during its reciprocation and to provide intake ports 20<sup>a</sup> between said segments for the admission of a lubricant therethrough. Each of the segments 19 and 20 is substantially rectangular in cross-section, and has each of its peripheral edges beveled, at 21, 22, 23, 24, whereby concentric grooves, as 25 and 26, are provided when the segments are arranged to form the rings 18 and when said rings are assembled. The concentric grooves 25 and 26 are in communication with the intake ports 21 so that a lubricant, such as a mixture of graphite and oil, may pass from the grooves 25 through the intake ports and to the grooves 26 for distribution upon the piston rod 11.

The annular members or rings 18 when assembled are movably held between an annular supporting element or ring 27 and a follower or ring 28. The supporting element or ring 27 may be composed of two superposed annular members or rings 29 and 30, which are connected by screws, as 31. The ring 29 may be composed of two sections 32 and 33, and the ring 30 may also be composed of two sections 34 and 35 whereby the ends of the sections of both of said rings may be spaced apart, as shown in Figs. 3 and 4, so as to permit the lubricant to be forced therethrough. The ring 30 is of a diameter to fit snugly within the stuffing box 12 and the ring 29 is larger in diameter than said ring 30 whereby a flange 34 is provided for abutting against the stuffing box 12 when the packing is fitted therein. In the top surface of the ring 30 is an annular groove $34^a$ in which is movably seated the lower end of a movable element or jacket $35^a$ as will be hereinafter more fully described. The follower or ring 28 may likewise be composed of two superposed annular members or rings 36 and 37, and connected by screws, as 38. Each of the annular members or rings 36 and 37 consists of two sections 39 and 40 Fig. 5, 41, Fig. 2, and 42 Fig. 1 respectively so that when assembled the ends of the sections of each ring may be spaced apart, as shown in Fig. 5, and Fig. 2, as shown by solid lines at $a$, and dotted lines at $b$, and in Fig. 1, by dotted lines at $a'$ for passage of a lubricant. In the underneath surface of the ring 37 is an annular groove in which is movably seated the upper end of the movable element or jacket $35^a$.

As illustrated in Fig. 1, the follower or ring 28 is of a diameter to fit closely against the inner surface of the stuffing box 12, while the annular members or rings 18 are of considerably less diameter than the interior of the stuffing box in order to provide a concentric space 43 between the wall of the stuffing box and the exterior surfaces of the rings 28.

Between the supporting element or ring 27 and the follower or ring 28, and snugly fitting the exterior surface of the annular members or rings 18 is a sleeve 44. The sleeve 44 is made preferably of yielding metal, and is split vertically, as at $45^a$ Fig. 3, so as to permit said sleeves to be of normally smaller diameter than the rings 18 whereby its ends will preferably be spaced apart when expanded around said rings. At spaced intervals through the sleeve 44 are a plurality of openings 45 so as to permit a lubricant to be forced therethrough from the concentric space 43 to the concentric grooves 25 and 26, and slightly spaced from the apertured sleeve 44 is the movable element or jacket $35^a$. The jacket $35^a$ is composed of two sections 46 and 47, each of which is semi-cylindrical in shape, and is provided with a plurality of spaced openings 48, see Figs. 1 and 2 of the drawings, adjacent to the upper and lower edges thereof whereby the lubricant may be directed therethrough from the concentric space 43, through the apertures 45 of the sleeve 44, through the intake ports 21 of the rings 18 and to the concentric grooves 26 thereof to the piston rod.

As a means to supply the lubricant to the packing, and to force the lubricant under pressure to all parts of the packing, in one part of the stuffing box is an opening $48^a$, and held in said opening is one end of a feed pipe 49. Upon the opposite end of the feed pipe 49 is a compression cup 50 which may be of the usual or any preferred type, and interposed in said feed pipe is a cut-off valve or cock 51 for regulating the flow of the lubricant through the pipe. Any desired quantity of the lubricant may be kept in the compression cup 50, and by operating said cup in the usual manner a sufficient quantity of the lubricant may be supplied to the packing and piston rod at desired intervals.

In the foregoing description I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope thereof.

Having thus described my invention, I claim as new and desire to secure by Letters Patent:—

1. In a rod packing, a plurality of superposed annular members adapted to be relatively moved, each of said members having an intake port for passage of a lubricant, a top ring and a bottom ring for the annular members, an apertured sleeve inclosing all of the members, said sleeve being removably held to the top ring and bottom ring, and an apertured jacket encircling the sleeve, said jacket being also removably held to the top ring and bottom ring.

2. In a rod packing, a plurality of superposed annular members adapted to be relatively moved and each composed of a plurality of sections, the sections of each member being spaced so as to provide therebetween an intake port for the passage of a lubricant, a top ring and a bottom ring for the annular members, an apertured sleeve inclosing all of the members, said sleeve being removably held to the top ring and bottom ring, and an apertured jacket encircling the sleeve, said jacket being also removably held to the top ring and bottom ring.

3. In a rod packing, a plurality of superposed annular members, each of which is substantially rectangular in cross-section and having one edge thereof beveled whereby an annular groove is provided between each member, and each of the annular members having an intake port for passage of a lubricant, a top ring and a bottom ring for the annular members, an apertured sleeve for inclosing all of the members, said sleeve being removably held to the top ring and bottom ring, and an apertured jacket encircling the sleeve, said jacket being also removably held to the top ring and bottom ring.

4. In a rod packing, a plurality of superposed annular members adapted to be relatively moved and each composed of two sections which are substantially rectangular in cross-section and having each of its edges beveled whereby a plurality of grooves are provided between the edges of said members, said sections being spaced apart so as to provide intake ports for passage of a lubricant, a top ring and a bottom ring for the annular members, an apertured sleeve inclosing all of the members, said sleeve being removably held to the top ring and bottom ring, and an apertured jacket encircling the sleeve, said jacket being also removably held to the top ring and bottom ring.

5. In a rod packing, a plurality of superposed annular members adapted to be relatively moved, each of said members having an intake port for passage of a lubricant, an apertured sleeve inclosing all of the members, and means adapted to force under pressure a lubricant through the apertures of the sleeve and through the intake ports of the annular members.

6. In a rod packing, a plurality of superposed annular members adapted to be relatively moved and each composed of a plurality of sections, the sections of each member being spaced so as to provide therebetween an intake port for the passage of a lubricant, an apertured sleeve inclosing all of the members, and means adapted to force under pressure a lubricant through the apertures of the sleeve and through the intake ports of the annular members.

7. In a rod packing, a plurality of superposed annular members, each of which is substantially rectangular in cross-section and having one edge thereof beveled whereby an annular groove is provided between each member, and each of the annular members having an intake port for passage of a lubricant, an apertured sleeve for inclosing all of the members, and means adapted to force under pressure a lubricant through the apertures of the sleeve and through the intake ports of the annular members.

8. In a rod packing, a plurality of superposed annular members adapted to be relatively moved and each composed of two sections which are substantially rectangular in cross-section and having each of its edges beveled whereby a plurality of grooves are provided between the edges of said members, said sections being spaced so as to provide intake ports for passage of a lubricant, an apertured sleeve inclosing all of the members, and means adapted to force under pressure a lubricant through the apertures of the sleeve and through the intake ports of the annular members.

9. In a rod packing, a plurality of superposed annular members adapted to be relatively moved, each of said members having an intake port for passage of a lubricant, an apertured sleeve inclosing all of the members, an apertured jacket encircling said sleeve, and means adapted to force under pressure a lubricant through the apertures of the jacket and the sleeve and through the intake ports of the annular members.

10. In a rod packing, a plurality of superposed annular members adapted to be relatively moved and each composed of a plurality of sections, the sections of each member being spaced so as to provide therebetween an intake port for the passage of a lubricant, an apertured sleeve inclosing all of the members, an apertured jacket encircling said sleeve, and means adapted to force under pressure a lubricant through the apertures of the jacket and the sleeve and through the intake ports of the annular members.

11. In a rod packing, a plurality of superposed annular members, each of which is substantially rectangular in cross-section and having one edge thereof beveled whereby an annular groove is provided between each member and each of the annular members having an intake port for passage of a lubricant, an apertured sleeve for inclosing all of the members, an apertured jacket encircling said sleeve, and means adapted to force under pressure a lubricant through the apertures of the jacket and sleeve and through the intake ports of the annular members.

12. In a rod packing, a plurality of superposed annular members adapted to be relatively moved and each composed of two sections which are substantially rectangular in cross-section and having each of its edges beveled whereby a plurality of grooves are provided between the edges of said members, said sections being spaced apart so as to provide intake ports for passage of a lubricant, an apertured sleeve inclosing all of the members, a jacket encircling said sleeve, and means adapted to force under pressure a lubricant through the apertures of the jacket and the sleeve and through the intake ports of the annular members.

13. The combination with a stuffing box through which a piston rod is reciprocable, said stuffing box having an opening in which is held one end of a pipe, of a plurality of superposed rings adapted to be relatively moved, each of said rings having an intake port for passage of a lubricant, an apertured yielding element inclosing all of the rings, a cut-off valve interposed in the pipe of the stuffing box, and a compression cup provided upon the opposite end of the pipe and adapted to force under pressure a lubricant through the apertures of the sleeve and through the intake ports of the rings.

14. The combination with a stuffing box through which a piston rod is reciprocable, said stuffing box having an opening in which is held one end of a pipe, of a plurality of superposed rings adapted to be relatively moved and each composed of a plurality of sections, the sections of each ring being spaced so as to provide therebetween an intake port for the passage of a lubricant, an apertured sleeve inclosing all of the rings, a cut-off valve interposed in the pipe of the stuffing box, and a compression cup provided upon the opposite end of the pipe and adapted to force under pressure a lubricant through the apertures of the sleeve and through the intake ports of the rings.

15. The combination with a stuffing box through which a piston rod is reciprocable, said stuffing box having an opening in which is held one end of a pipe, of a plurality of superposed rings, each of which is substantially rectangular in cross-section and having one edge thereof beveled whereby an annular groove is provided between each ring and each of the rings having an intake port for passage of a lubricant, an apertured sleeve for inclosing all of the rings, a cut-off valve interposed in the pipe of the stuffing box, and a compression cup provided upon the opposite end of the pipe and adapted to force under pressure a lubricant through the apertures of the sleeve and through the intake ports of the rings.

16. The combination with a stuffing box through which a piston is reciprocable, said stuffing box having an opening in which is held one end of a pipe, of a plurality of superposed rings adapted to be relatively moved and each composed of two sections which are substantially rectangular in cross-section and having each of its edges beveled whereby a plurality of grooves are provided between the edges of said rings, said sections being spaced apart so as to provide intake ports for passage of a lubricant, an apertured sleeve inclosing all of the rings, a cut-off valve interposed in the pipe of the stuffing box, and a compression cup provided upon the opposite end of the pipe and adapted to force under pressure a lubricant through the apertures of the sleeve and through the intake ports of the rings.

This specification signed and witnessed this seventeenth day of January A. D. 1912.

GEORGE W. LAUGHTON.

Witnesses:
ROBT. B. ABBOTT,
E. M. JERKE.

---

Copies of this patent may be obtained for five cents each, by addressing the "Commissioner of Patents, Washington, D. C."